United States Patent
Chang

(10) Patent No.: US 6,416,001 B1
(45) Date of Patent: Jul. 9, 2002

(54) CENTRIFUGAL BRAKE FOR FISHING REEL

(76) Inventor: Liang-Jen Chang, No. 23, Lane 184-15, Hsin-Ping Rd., Tai-Ping City, Taichung Hsien (TW)

( * ) Notice: Subject to any disclaimer, the term of this patent is extended or adjusted under 35 U.S.C. 154(b) by 0 days.

(21) Appl. No.: 09/629,671

(22) Filed: Aug. 1, 2000

(51) Int. Cl.⁷ .............................................. A01K 89/02
(52) U.S. Cl. ................................... 242/289; 188/181 A
(58) Field of Search ...................... 242/289; 188/181 A, 188/185

(56) References Cited

U.S. PATENT DOCUMENTS

| | | | | |
|---|---|---|---|---|
| 5,356,090 A | * | 10/1994 | Sato | 242/289 |
| 5,362,011 A | * | 11/1994 | Sato | 242/289 |
| 5,372,324 A | * | 12/1994 | Sato | 242/289 |
| 5,393,005 A | * | 2/1995 | Nakajima | 242/289 |
| 5,865,387 A | * | 2/1999 | Hirano | 242/289 |

* cited by examiner

*Primary Examiner*—Emmanuel M. Marcelo
(74) *Attorney, Agent, or Firm*—Christensen O'Connor Johnson Kindness PLLC

(57) ABSTRACT

A fishing reel includes a frame formed with a fixed annular frame portion, a spool including a fixed rotating shaft which is journalled on the frame, and a braking member. The braking member includes a rotary ring, a plurality of angularly equidistant rods, and a plurality of annular braking elements. The rotary ring is sleeved fixedly on the rotating shaft, and is disposed within the annular frame portion of the frame. The rods extend integrally, radially and outwardly from the rotary ring. Each of the rods has an inner radial area that is proximate to the rotary ring, and an outer radial area that is distal to the rotary ring. The braking elements are sleeved respectively and movably on the rods. Each of the braking elements has an engagement portion which is disposed slidably on the inner radial area of a respective one of the rods and which is movable forcibly to the outer radial area of the respective one of the rods, where the braking element is brought into contact with the annular frame portion of the frame by virtue of centrifugal force during rotation of the spool on the frame, thereby braking the spool.

3 Claims, 7 Drawing Sheets

CENTRIFUGAL BRAKE FOR FISHING REEL

BACKGROUND OF THE INVENTION

1. Field of the Invention

This invention relates to a brake for a fishing reel, more particularly to a centrifugal brake for a fishing reel which has a plurality of annular braking elements that are sleeved movably on a plurality of integrally formed rods.

2. Description of the Related Art

Referring to FIG. 1, a conventional fishing reel includes a frame 1 formed with a fixed annular frame portion 100, and a spool 2 which has a fixed rotating shaft 20 that is journalled on the frame 1. Referring to FIGS. 2 and 3, a braking unit is disposed on the spool 2 and within an accommodation space 101 in the frame 1, and includes a plastic mounting member 3 disposed fixedly on the spool 2, six plastic cross-shaped members 4, and six plastic annular braking elements 5. The mounting member 3 has six mounting portions 301, each of which is formed with aligned integral inner and outer ribs 302, 303. Each of the cross-shaped members 4 is inserted into a cross-shaped groove in a respective one of the mounting portions 301 of the mounting member 3, and is provided with a fixed metal rod 401, on which a respective one of the braking elements 5 is sleeved movably. Each of the braking elements 5 is formed with an outwardly extending flange 501 which is confined between the inner rib 302 of a respective one of the mounting portions 301 of the mounting member 3 and a respective one of the cross-shaped members 4. In this position, outer ends 502 of the braking elements 5 are spaced apart from the annular frame portion 101 of the frame 1. Each of the flanges 501 can be pushed radially and outwardly to an area between the inner and outer ribs 302, 303, where the outer end 502 of a respective one of the braking elements 5 is brought into contact with the annular frame 101 of the frame 1 by virtue of centrifugal force during rotation of the spool 2. One or more of the flanges 501 can be pushed to the area. The greater the number of the flanges 501 moved to the area, the larger will be the braking force applied to the spool 2. The aforesaid fishing reel has a drawback in that it is comprised of a relatively large number of parts which results in an increased manufacturing cost and a troublesome assembly process.

SUMMARY OF THE INVENTION

The object of this invention is to provide an inexpensive centrifugal brake for a fishing reel which has a comparatively small number of parts that can be assembled easily.

According to this invention, a fishing reel includes a frame formed with a fixed annular frame portion, a spool including a fixed rotating shaft which is journalled on the frame, and a braking member. The braking member includes a rotary ring, a plurality of angularly equidistant rods, and a plurality of annular braking elements. The rotary ring is sleeved fixedly on the rotating shaft, and is disposed within the annular frame portion of the frame.

The rods extend integrally, radially and outwardly from the rotary ring. Each of the rods has an inner radial area that is proximate to the rotary ring, and an outer radial area that is distal to the rotary ring. Each of the rods is formed with an inner projection unit and an outer projection unit which are aligned with and which are spaced apart from each other in a radial direction of the rotary ring. The inner projection units are proximate to the rotary ring while the outer projection units are distal to the rotary ring. The inner radial area is defined between the rotary ring and the inner projection units whereas the outer radial area is defined between the inner and outer projection units.

The braking elements are sleeved respectively and movably on the rods. Each of the braking elements has an engagement portion which is disposed slidably on the inner radial area of a respective one of the rods and which is movable forcibly to the outer radial area of the respective one of the rods, where the braking element is brought into contact with the annular frame portion of the frame by virtue of centrifugal force during rotation of the spool on the frame, thereby braking the spool. Each braking element has an inner surface which is formed with an integral tongue unit that constitutes a respective one of the engagement portions. The tongue unit is disposed between the rotary ring and the inner projection units so that the braking elements are spaced apart from the annular frame portion of the frame. The braking elements may be movable forcibly, radially and outwardly on the rods so as to move the tongue units of the braking elements past the inner projection units to the outer radial areas between the inner and outer projection units.

Because the rods are formed integrally on the rotary ring, the number of the parts of the braking member are reduced considerably.

BRIEF DESCRIPTION OF THE DRAWINGS

These and other features and advantages of this invention will become apparent in the following detailed description of a preferred embodiment of this invention, with reference to the accompanying drawing, in which.

DETAILED DESCRIPTION OF THE PREFERRED EMBODIMENT

Figure 1:
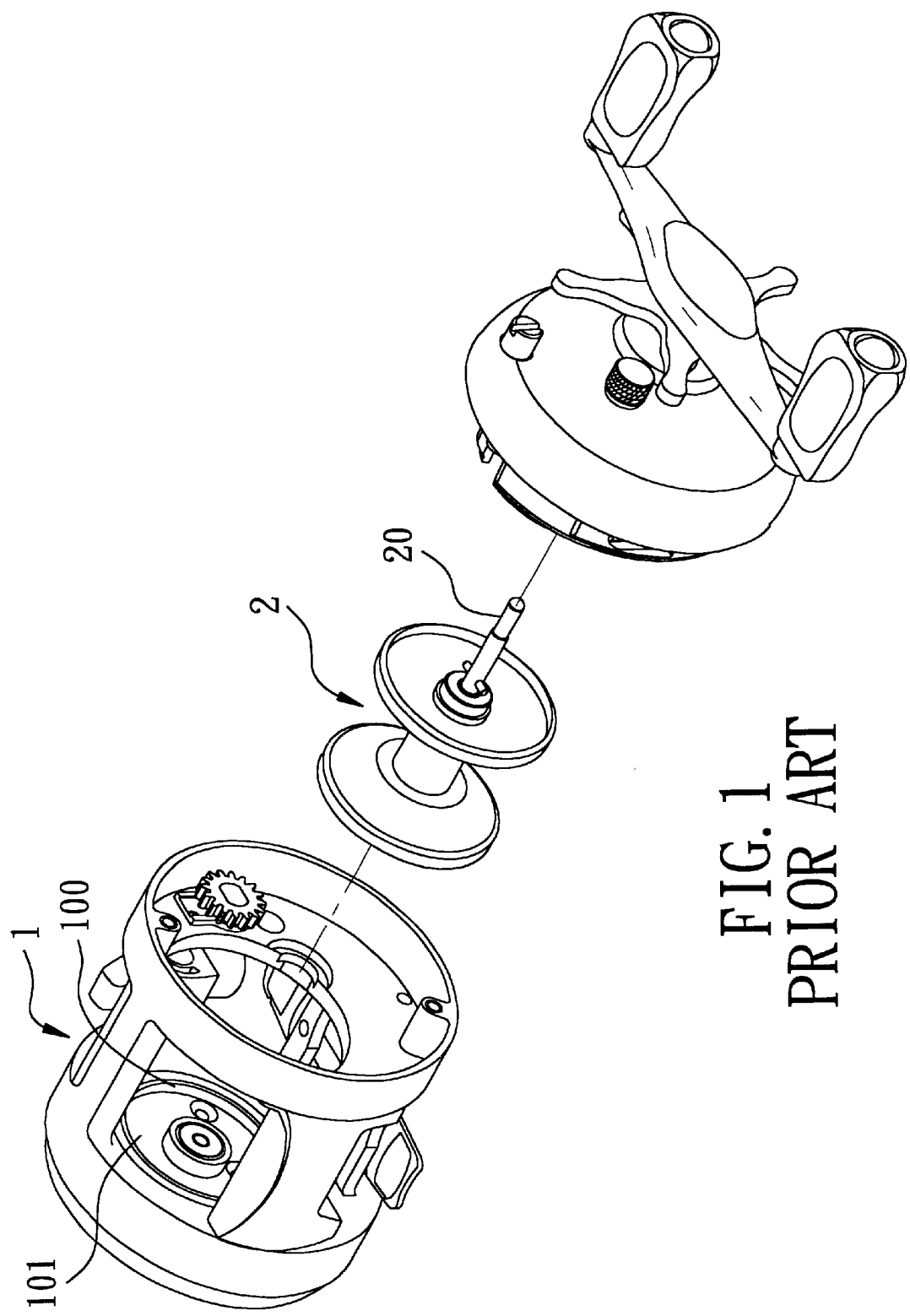
FIG. 1 is an exploded view of a conventional fishing reel.
Figure 2:
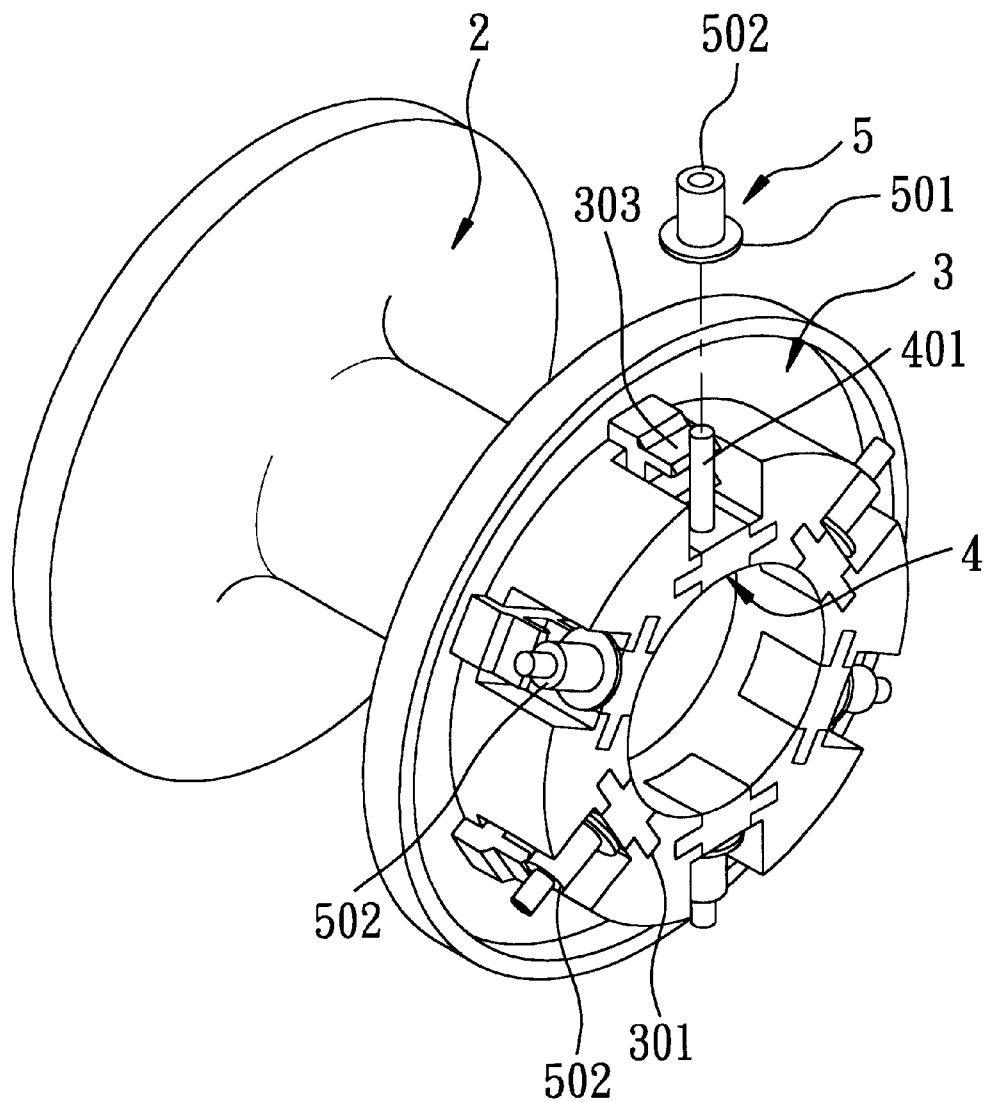
FIG. 2 is a perspective view of a spool of the conventional fishing reel, in which an annular braking element is removed from a rod for the sake of clarity.
Figure 3:
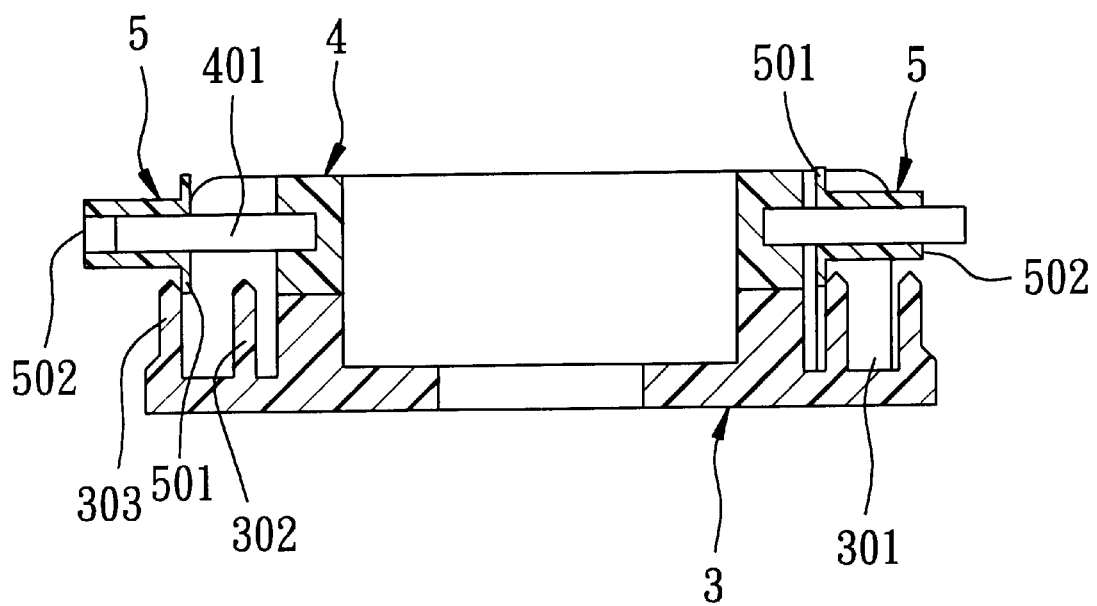
FIG. 3 is a sectional view of a braking unit of the conventional fishing reel.
Figure 4:
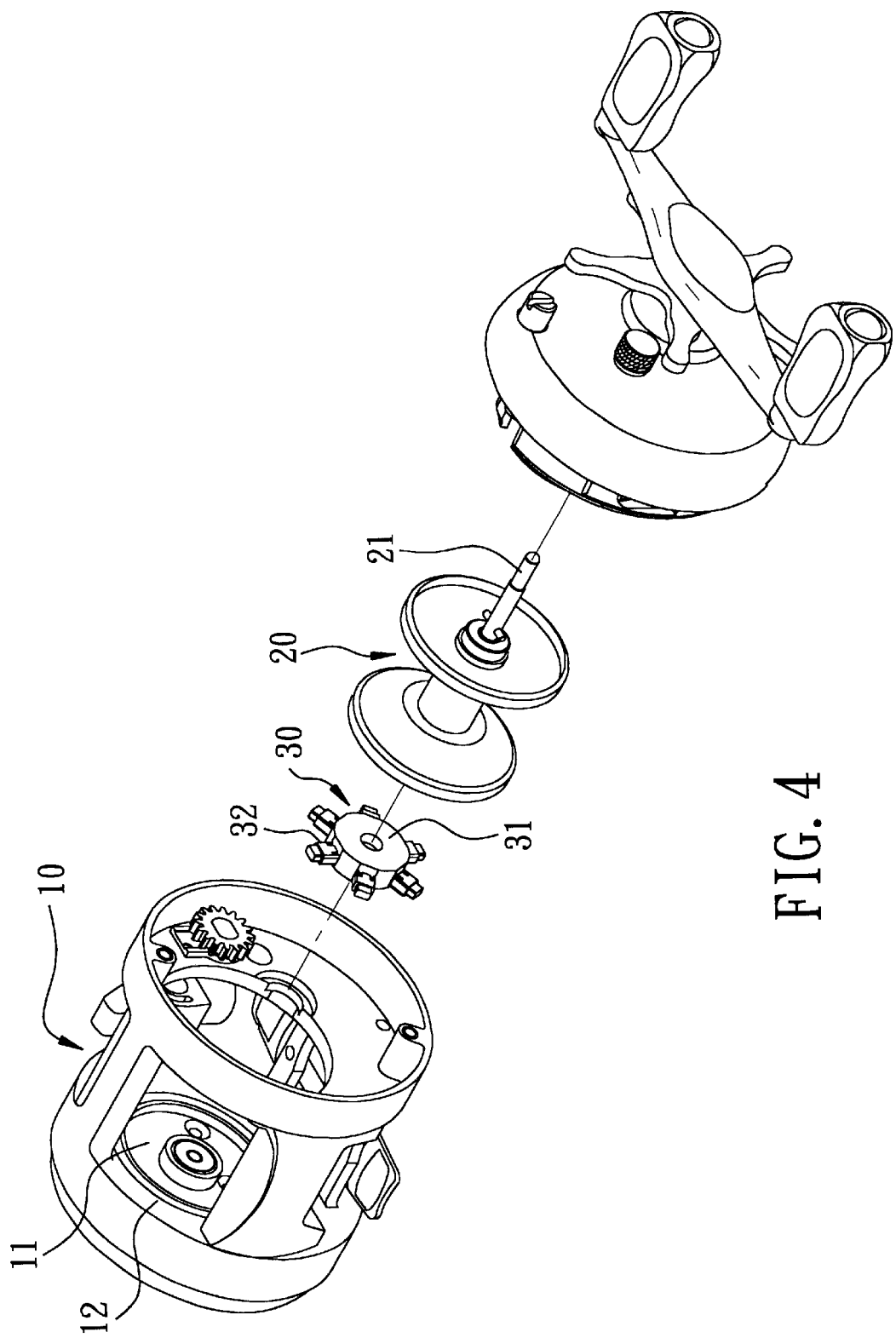
FIG. 4 is an exploded view of the preferred embodiment of a fishing reel according to this invention.

Referring to FIG. 4, the preferred embodiment of a fishing reel according to this invention is shown to include a frame 10 formed with an accommodation space 11 and a fixed annular frame portion 12, a spool 20 having a fixed rotating shaft 21 which is journalled on the frame 10, and a braking member 30.

Figure 5:
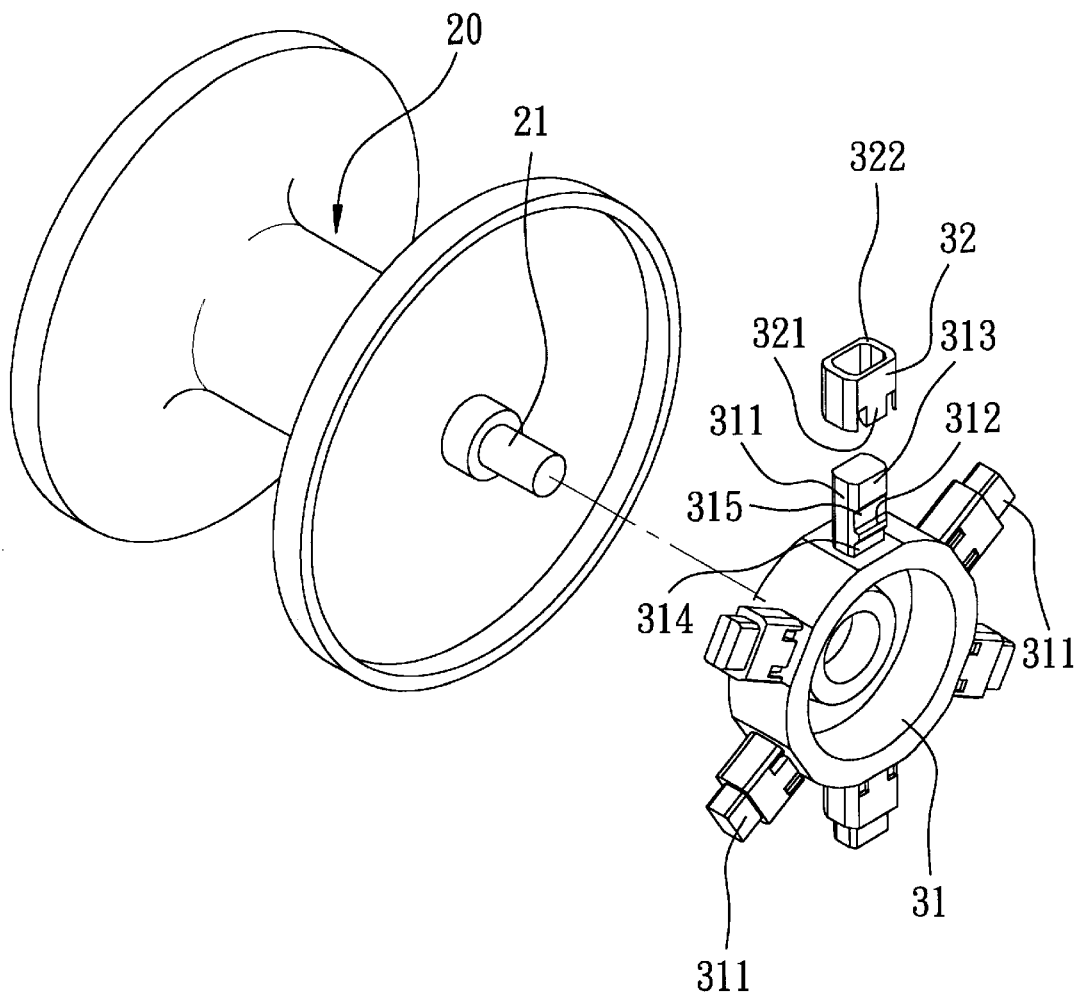
FIG. 5 is a partly exploded view of a spool and a braking member of the preferred embodiment.
Figure 6:
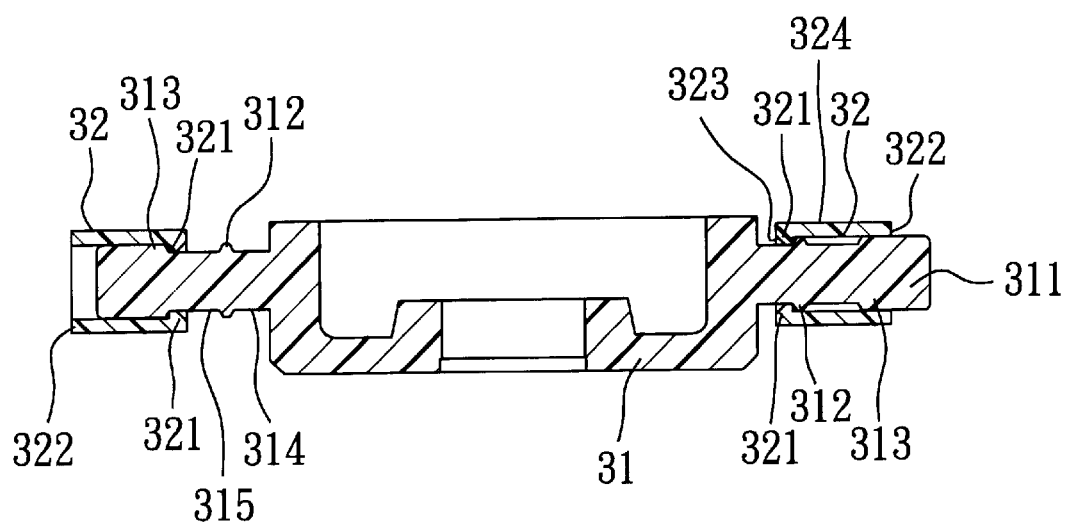
FIG. 6 is a sectional view of the braking member of the preferred embodiment, in which a tongue unit of a left braking element is confined within an outer radial area of a rod, while a tongue unit of a right braking element is confined within an inner radial area of another rod.

Referring to FIGS. 4, 5, and 6, the braking member 30 includes a plastic rotary ring 31, a plurality of angularly equidistant rods 311, and a plurality of plastic annular braking elements 32. The rotary ring 31 is sleeved fixedly on the rotating shaft 21 of the spool 20, and is disposed within the annular frame portion 12 of the frame 10.

The rods 311 extend integrally, radially and outwardly from the rotary ring 31. Each of the rods 311 has an inner radial area 314 that is proximate to the rotary ring 31, and an outer radial area 315 that is distal to the rotary ring 31.

In this embodiment, each of the rods 311 is formed with an inner projection unit 312 and an outer projection unit 313 which are aligned with and which are spaced apart from each other in a radial direction of the rotary ring 31. The inner projection units 312 are proximate to the rotary ring 31. The outer projection units 313 are distal to the rotary ring 31. The inner radial areas 314 are defined between the rotary ring 31 and the inner projection units 312. The outer radial areas 315 are defined between the inner and outer projection units 312, 313.

As illustrated, each of the rods 311 has two opposite side surfaces. Each of the inner and outer projection units 312, 313 has two projections which project respectively, integrally and outwardly from the side surfaces of a respective one of the rods 311 and which extend away from each other.

The braking elements 32 are sleeved respectively and movably on the rods 311. Each of the braking elements 32 has an inner surface which is formed with an integral tongue unit or engagement portion that includes two generally L-shaped tongues 321 and that is disposed slidably on the inner radial area 314 of a respective one of the rods 311 so that the braking elements 32 are spaced apart from the annular frame portion 12 of the frame 10. The tongue unit of each of the braking elements 32 is movable forcibly past a respective one of the inner projection units 312 to the outer radial area 315 of the respective one of the rods 311, where an outer end 322 of the braking element 32 is brought into contact with the annular frame portion 12 of the frame 10 by virtue of centrifugal force during rotation of the spool 20 on the frame 10, thereby braking the spool 20.

In this embodiment, each of the tongues 321 has a longitudinal portion 324 (see FIG. 6) with an outer end, and a transverse portion 323 (see FIG. 6) that extends transversely and inwardly from the outer end of the longitudinal portion 324 and that is inserted between the rotary ring 31 and a respective one of the projections of a respective one of the inner projection units 312.

The tongues 321 of the braking element 32 located on the left side of FIG. 6 are confined within an outer radial area 315 of a respective one of the rods 311, while those located on the right side of FIG. 6 are confined within an inner radial area 314 of the respective one of the rods 311.

Figure 7:
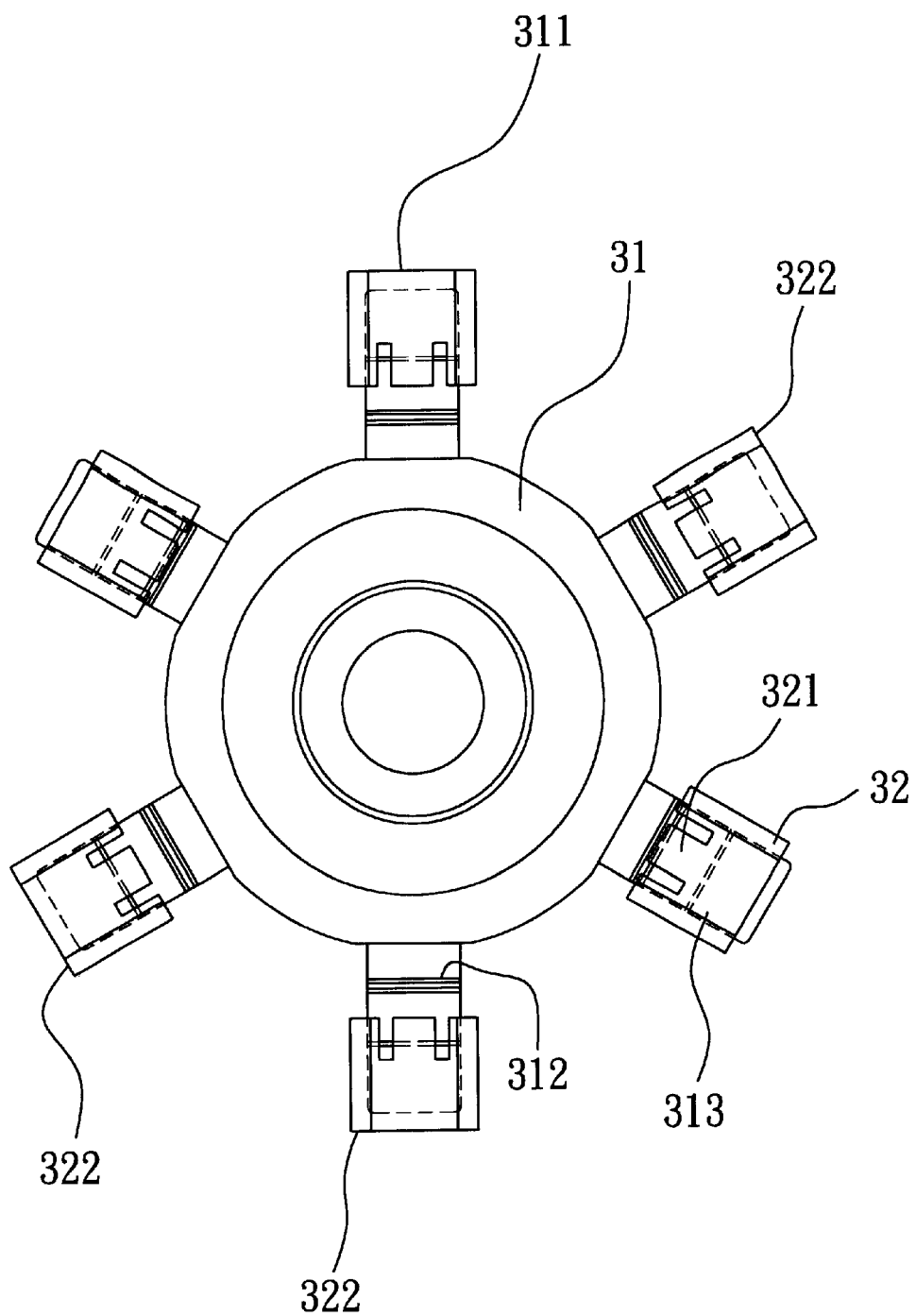
FIG. 7 is a front view of the braking member of the preferred embodiment, in which all six braking elements of the braking member are in positions for braking the spool.

All of the braking elements 32 can be moved to braking positions, in which the tongues 321 are located within the outer radial areas 315, thereby providing a maximum braking force to the spool 20, as shown in FIG. 7.

From the foregoing, it is evident that the braking member 30 of this invention is composed of a relatively small number of parts, thereby reducing the manufacturing costs and the time spent to assemble the parts.

With this invention thus explained, it is apparent that numerous modifications and variations can be made without departing from the scope and spirit of this invention. It is therefore intended that this invention be limited only as indicated by the appended claims.

I claim:

1. A fishing reel comprising:
   a frame formed with a fixed annular frame portion;
   a spool including a fixed rotating shaft which is journalled on said frame; and
   a braking member including
      a rotary ring sleeved fixedly on said rotating shaft and disposed within said annular frame portion of said frame,
      a plurality of angularly equidistant rods extending integrally, radially and outwardly from said rotary ring, each of said rods having an inner radial area that is proximate to said rotary ring, and an outer radial area that is distal to said rotary ring, wherein each of said rods is formed with an inner projection unit and an outer projection unit which are aligned with and which are spaced apart from each other in a radial direction of said rotary ring, said inner projection units being proximate to said rotary ring, said outer projection units being distal to said rotary ring, said inner radial areas being defined between said rotary ring and said-inner projection units, said outer radial areas being defined between said inner and outer projection units, and
      a plurality of annular braking elements sleeved respectively and movably on said rods, each of said braking elements having an engagement portion which is disposed slidably on said inner radial area of a respective one of said rods and which is movable forcibly to said outer radial area of the respective one of said rods, where said braking element is brought into contact with said annular frame portion of said frame by virtue of centrifugal force during rotation of said spool on said frame, thereby braking said spool, each of said braking elements having an inner surface which is formed with an integral tongue that constitutes a respective one of said engagement portions, said tongue units being disposed between said rotary ring and said inner projection units so that said braking elements are spaced apart from said annular frame portion of said frame, said braking elements being movable forcibly, radially and outwardly on said rods so as to move said tongue units of said braking elements past said inner projection units to said outer radial areas between said inner and outer projection units.

2. The fishing reel as claimed in claim 1, wherein each of said rods has two opposite side surfaces, each of said inner and outer projection units including two projections which project respectively, integrally and outwardly from said side surfaces of a respective one of said rods and which extend away from each other, each of said braking elements being made of plastic, said tongue unit of each of said braking elements including two tongues, each of which is inserted between said rotary ring and a respective one of said projections of a respective one of said inner projection units.

3. The fishing reel as claimed in claim 2, wherein each of said tongues is generally L-shaped, and has a longitudinal portion with an outer end, and a transverse portion that extends transversely and inwardly from said outer end of said longitudinal portion and that is inserted between said rotary ring and the respective one of said projections of the respective one of said inner projection units.

* * * * *